(12) United States Patent
Warren

(10) Patent No.: US 6,827,526 B2
(45) Date of Patent: *Dec. 7, 2004

(54) METHOD AND DEVICE FOR LINING A SEWER PIPE

(75) Inventor: Darcy Warren, Essex (CA)

(73) Assignee: Liqui-Force Sewer Services Inc. (CA)

( * ) Notice: Subject to any disclaimer, the term of this patent is extended or adjusted under 35 U.S.C. 154(b) by 52 days.

This patent is subject to a terminal disclaimer.

(21) Appl. No.: 10/146,244

(22) Filed: May 15, 2002

(65) Prior Publication Data

US 2003/0215291 A1 Nov. 20, 2003

(51) Int. Cl.⁷ .................................................. F16L 55/18
(52) U.S. Cl. ..................................... 405/184.2; 138/197
(58) Field of Search ..................... 405/184.2, 184.1, 405/184, 174; 138/97, 98

(56) References Cited

U.S. PATENT DOCUMENTS

| | | | | |
|---|---|---|---|---|
| 5,520,484 A | * | 5/1996 | Kamiyama et al. | 405/184.2 |
| 5,927,341 A | * | 7/1999 | Taylor | 138/98 |
| 5,950,682 A | * | 9/1999 | Kiest, Jr. | 138/98 |
| 6,001,212 A | * | 12/1999 | Polivka et al. | 156/287 |
| 6,093,363 A | * | 7/2000 | Polivka | 264/516 |
| 6,487,679 B1 | | 11/2002 | Arimilli et al. | |

OTHER PUBLICATIONS

Patent application No. 10/272,573 filed on Oct. 16, 2002.

* cited by examiner

Primary Examiner—Frederick L. Lagman
(74) Attorney, Agent, or Firm—Carlson, Gaskey & Olds

(57) ABSTRACT

An assembly for introducing a pipe liner into a sewer pipe includes a launcher defining a passageway through which a resin impregnated pipe liner and bladder tube assembly passes. An inflatable member mounted to the launcher assembly is actuatable between an inflatable condition and a deflated condition. The pipe liner and bladder tube are secured in place by expanding the inflatable member outward against the inner surface of the sewer pipe. Air pressure drives the bladder tube and pipe liner into the sewer pipe and the bladder tube remains in place until the pipe liner hardens.

17 Claims, 5 Drawing Sheets

METHOD AND DEVICE FOR LINING A SEWER PIPE

BACKGROUND OF THE INVENTION

This invention relates to an assembly and method for installing a pipe liner within a sewer pipe, and specifically to an assembly and method for installing a pipe liner within a specific discrete section of a sewer pipe.

Typically, a sewer pipe includes a main line, which extends substantially parallel to a street or road. Residents or buildings include branch lines that extend from the building to the main line. Conventional repair of sewer pipes includes digging the pipes up and replacing the damaged areas. Often times it is undesirable to dig a hole to obtain access to the sewer pipes. Further, digging a hole to gain access to sewer pipes is expensive, unsightly, and very undesirable along with being time consuming.

It is known in the art to reline sewer pipes in place through access holes such as manholes. The relining in place process includes a resin impregnable liner installed within the tube and held in place until hardened. The resin impregnable liner becomes a new pipe installed within the old pipe. This method of repair is essentially transparent to residents, meaning that the surrounding area is not disturbed or dug up. The relining process includes the use of an inflatable bladder along with the resin impregnable pipe liner that inserts within the sewer pipe. The bladder tube inflates to drive the resin impregnable pipe liner outward against the inner surface of the sewer pipe. The bladder tube remains inflated in place until the resin impregnable pipe liner hardens.

Typically, main line sewer pipe are relined by securing one end of the pipe liner and bladder at a first manhole and driving the bladder tube to a second manhole. Such a process necessarily will block any branch or lateral sewer lines feeding into the main line. These branch lines are later reinstated by various types of cutting machines either inserted within an opposite end of the branch line or from the main line. Often the opposite end of the branch line is accessible only from within a residence. As appreciated, dragging equipment into a private residence for reinstating the connection of a branch sewer line to a main sewer line is often not desirable.

Further, reinstatement of the branch line from within a main line requires knowledge of the precise location of the branch line and the ability to locate appropriate cutting machines at that location. This may require expensive and cumbersome equipment. It is for these reasons that methods of relining only those sections requiring repair have been developed.

Conventional methods of relining only discrete locations within a main line sewer pipe include the use of a combined bladder/pipe liner assembly having a pipe liner attached to the bladder by way of a frangible connection. This method operates by inflating the bladder assembly into the main line sewer with the pipe liner attached thereto. Once the pipe liner has hardened the bladder is tugged ripping the frangible connection to allow the removal of the bladder tube. This method requires a custom fabricated bladder/tube assembly that increases cost and involves a substantial lead-time. As appreciated, lead-time increases costs associated with a pipe relining operation. Further, often a contractor is responsible for relining a great many sewer pipes of differing lengths and diameters. The effort of accounting for each custom fabricated bladder/pipe liner assembly adds additional expense and burden.

Accordingly, it is desirable to develop an assembly and method for installing within a resin impregnable pipe liner within a discrete sections of main line sewer pipe without necessitating reinstatement of each branch line pipe or the need for custom fabricated bladder and pipe liner assemblies.

SUMMARY OF THE INVENTION

An embodiment of this invention is a launcher assembly including an inflatable member actuatable between inflated and deflated conditions for anchoring the launcher at a desired location within a sewer pipe during installation of a pipe liner to discrete locations within a main line sewer.

The launcher includes a body defining a passage through which the pipe liner and a bladder assembly pass during installation into a sewer pipe. Preferably the body is cylindrical having with an inner diameter defining the passageway and an outer diameter. An inflatable member mounts to an outer diameter of the body.

The inflatable member attaches to the body to define a cavity. The body includes a mounting slot that cooperates with a pin disposed on collar. A clamp secures a carrier tube to the collar. The carrier tube is a flexible tube extending within the main line providing a protected passage for the pipe liner and bladder assembly. The carrier tube attaches to the collar by way of the clamp. An o-ring is disposed between the body of the launcher and the collar of the carrier tube to create an airtight seal.

In preparation of installation within the sewer pipe the pipe liner and bladder tube are cuffed over the inflatable member such that upon inflation of the inflatable member both the bladder tube and pipe liner are trapped between the body of the launcher and an inner surface of the sewer pipe. The remaining length of the pipe liner and bladder tube are disposed within the passage defined by the body of the launcher assembly. Once the inflatable collar has trapped the bladder and pipe liner against the inner surface of the sewer pipe, air pressure applied, as indicated by arrows A, drives the bladder assembly and pipe liner into the main line sewer pipe. As the air pressure indicated at A, drives the bladder and pipe liner into the sewer pipe, the entire length of the pipe liner is drawn through the passage of the launcher assembly. The bladder remains inflated until the pipe liner hardens. Once the pipe liner is hardened, the bladder is deflated and the launcher removed from the sewer pipe.

Another embodiment of the launcher assembly includes a guide and a retainer. The retainer along with the inflatable member define an outer diameter sized to correspond to the inner diameter of the sewer pipe in which a pipe liner is be installed. The guide includes a smaller diameter, allowing for attachment of a positioning device to an attachments lug. Further the outer diameter of the guide defines a passageway through which the pipe liner and bladder assembly pass. The guide and the retainer can be constructed as a single assembly.

Another embodiment of the launcher includes a retainer detachably assembled to the guide. The retainer includes an outer diameter specifically sized for application of a pipe liner to a sewer line of a specific inner diameter or range of diameters. As appreciated, for sewer pipes of differing inner diameters different retainer outer diameters are required, while a single outer diameter of the guide can be used for a greater range of sewer pipe applications. The guide provides a passage through which the pipe liner and bladder tube assembly pass during installation. The passage size allows non-restrictive movement of the pipe liner and bladder assembly therethrough during installation and therefore can be of a smaller diameter relative to the retainer and the inner diameter of the sewer pipe.

The guide includes a flange with a plurality of openings for fasteners. A seal disposed between the guide and the retainer prevents air leakage during assembly. Because the guide is separate and attachable to the retainer, retainers of differing sizes can be mated to a single guide. This reduces the amount of equipment required for assembly of pipe liners to sewer pipes of differing sizes.

This invention also includes a method for installing a pipe liner within a sewer pipe. The method of this invention provides for the installation of a pipe liner to a discreet portion of a sewer pipe by anchoring the pipe liner and bladder assembly with the launcher assembly and driving the pipe liner and bladder tube assembly forward of the launcher assembly to line the desired section of sewer pipe.

The method includes the installation of the pipe liner and bladder assembly to the body of the launcher. Preparation for installation of the pipe liner into the sewer pipe includes installing the bladder tube into the launcher assembly. Installation of the bladder tube includes cuffing or overlapping the bladder assembly around the inflatable member. The bladder tube assembly is then clamped to the outer surface of the body by way of hose clamp.

In the next step, the pipe liner is cuffed over the inflatable member on the outside of the bladder. The pipe liner is impregnated with a curable resin before being installed onto the launcher assembly. A positioning device attaches to lugs of the launcher assembly and moves the launcher into position. Cameras are positioned in multiple locations within the sewer line to provide necessary views for proper positioning of the launcher. The launcher is positioned relative to a discrete location within the sewer pipe such as a hole or damaged section of sewer pipe. Further, the launcher may also be position such that pipe liner is not installed over openings leading to branch sewer lines.

The inflatable collar is then actuated to the inflated condition to trap the bladder and pipe liner against the inner surface of the sewer pipe. Air pressure applied to the bladder tube assembly drives the bladder assembly and pipe liner into the main line sewer pipe. Extension of the bladder assembly and pipe liner occurs substantially instantaneously at a pressure creating enough force to drive the pipe liner into the sewer pipe. The inflatable member is then deflated. The bladder supports the launcher assembly once fully inflated and remains inflated until the pipe liner hardens. Once the pipe liner is hardened, the bladder is deflated and the launcher removed from the sewer pipe.

The launcher assembly of this invention provides a device and method of anchoring a pipe liner and bladder assembly within a main line sewer pipe allowing installation of the pipe liner to a specific discrete location within the main line sewer pipe.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
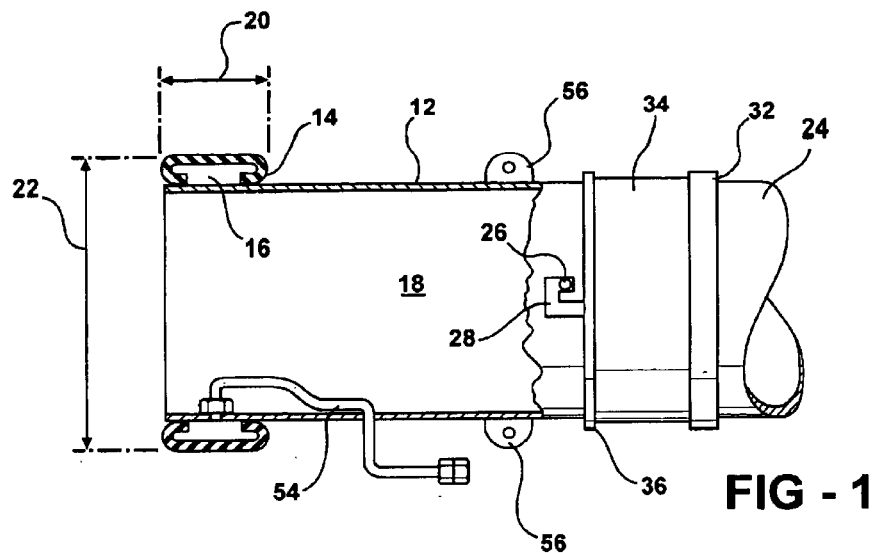
FIG. 1 is a cross-sectional view of a launcher assembly for installing a pipe liner.
Figure 3:
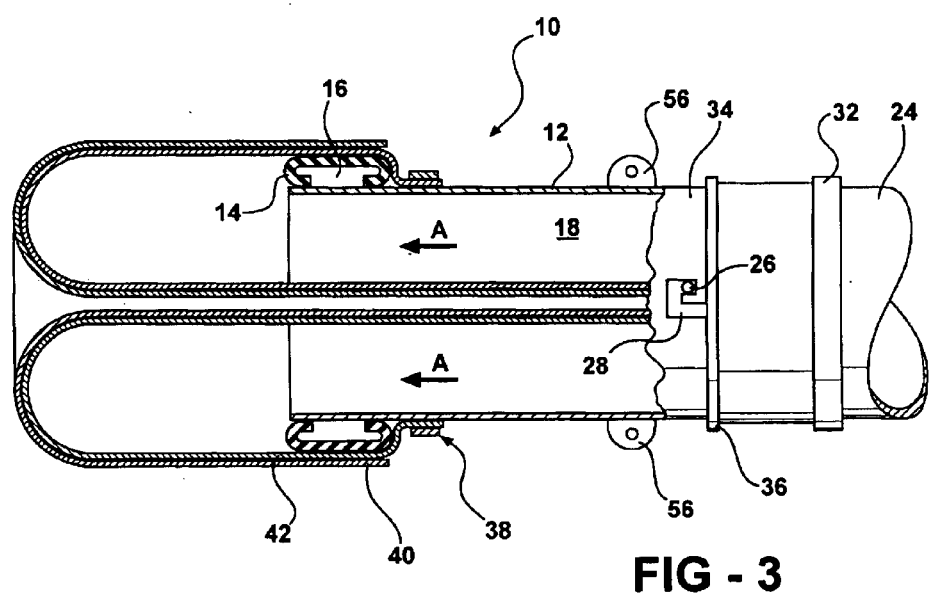
FIG. 3 a cross-sectional view of the launcher assembly with a pipe liner and a bladder assembly.

Referring to FIGS. 1 and 3, an embodiment of this invention is a launcher assembly 10 for installing a pipe liner 40 within a sewer pipe and includes a body 12 defining a passage 18 through which the pipe liner 40 and a bladder assembly 48 passes during installation into a branch line sewer pipe. Preferably the body 12 is cylindrical having an inner diameter defining the passageway 18. An inflatable member 14 mounts to an outer diameter of the body 12. The inflatable member 14 includes a width 20 sized according to specific application requirements.

Figure 2A:
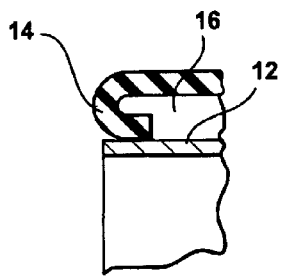
FIG. 2A is a partial cross-sectional view of the inflatable member in a deflated condition.
Figure 2B:
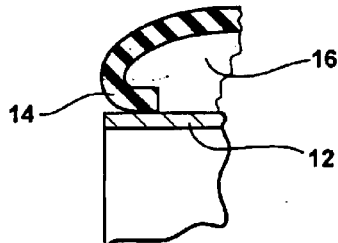
FIG. 2B is a partial cross-sectional view of the inflatable member in an inflated condition.

Referring to FIGS. 2A and 2B, the inflatable member 14 is attached to the body 12 to define a cavity 16. The inflatable member 14 is actuatable between an inflated condition (FIG. 2B) and a deflated condition (FIG. 2A). The cavity 16 is an airtight space into which air is introduced by way of an air inlet 54.

Referring to FIG. 1, the body 12 includes a mounting slot 28 that cooperates with a pin 26 disposed on collar 34. A clamp 32 secures a carrier tube 24 to the collar 34. The carrier tube 24 is a flexible tube extending within the main line providing a protected passage for the pipe liner 40 and bladder assembly 42. The carrier tube 24 attaches to the collar 34 by way of clamp 32. Clamp 32 is typically a hose clamp or any other such clamp that is known to a worker skilled in the art. Seal 36 is disposed between the body 12 of the launcher 10 and the collar 34 of the carrier tube 24.

The body 12 along with the inflatable member 14 defines an outer diameter 22. The outer diameter 22 fits within a sewer pipe along with the bladder assembly 42 and the pipe liner 40. Preferably, the inflatable member 14 is a collar disposed around the entire circumference of the body 12.

Preferably, the inflatable member 14 is bonded to the outer surface of the body 12 to form the airtight cavity 16. Although preferably the inflatable member 14 is a collar disposed about the outer diameter of the body 16, it is within the contemplation of this invention that the inflatable member 14 be disposed in discrete locations about the outer surface of the body 12. Further, it is within the contemplation of this invention that the inflatable member 14 may be of any configuration calculated to hold both the launcher 10 along with the bladder tube 42 and pipe liner 40 within a sewer pipe.

Referring to FIG. 3, the launcher assembly 10 is shown with the pipe liner 40 and bladder tube 42 assembled to the launcher 10 in preparation for installation within a sewer pipe. The pipe liner 40 and bladder tube 42 are cuffed over the inflatable member 14 such that upon inflation of the inflatable member 14 both the bladder tube 42 and pipe liner 40 are trapped between the body 12 and an inner surface of a sewer pipe. The remaining length of the pipe liner 40 and bladder tube 42 are disposed within the passage 18 defined by the body 12 of the launcher assembly 10.

Figure 4:
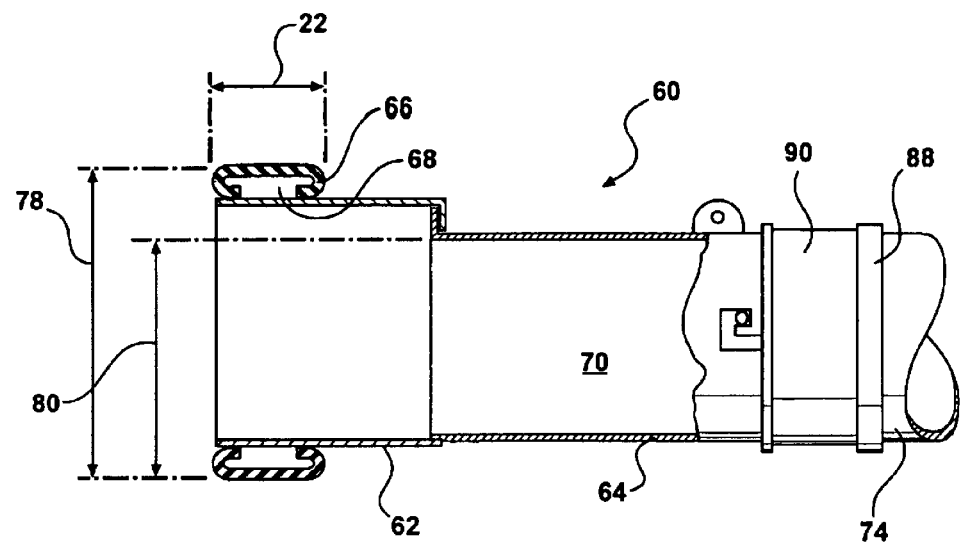
FIG. 4 is a cross-sectional view of an alternate embodiment of the launcher assembly.

Referring to FIG. 4, another embodiment of the launcher assembly 60 includes a guide 64 and a retainer 62. The guide 64 includes a collar 90. A clamp 88 secures a carrier tube 74 to the collar 90. The retainer 62 along with the inflatable member 66 define an outer diameter 78 sized to correspond to the inner diameter of the sewer pipe in which a pipe liner is be installed. As appreciate, the specific outer diameter 78 of the retainer 62 is determined according to each specific application in concert with the respective thickness of a pipe liner and bladder tube assembly. The outer diameter 78 is sized to accommodate movement of the launcher 60 to the installation location with the sewer pipe, while also retaining the bladder tube assembly and pipe liner, along with the launcher itself within the sewer pipe with the inflatable member 66 in the inflated condition.

The guide 64 includes a smaller diameter 80, allowing for attachment of a positioning device to an attachments lug 92. Further, the guide 64 defines a passageway 70 through which the pipe liner and bladder assembly pass. The guide 64 and the retainer 62 can be constructed as a single assembly. The guide 64 is offset from the retainer 62 to provide additional room on one side of the launcher 60 while within the sewer pipe. Although, preferably the guide 64 is offset from the retainer 62, it is within the contemplation of this invention that the guide 64 be concentrically located relative to the retainer 62.

Figure 5:
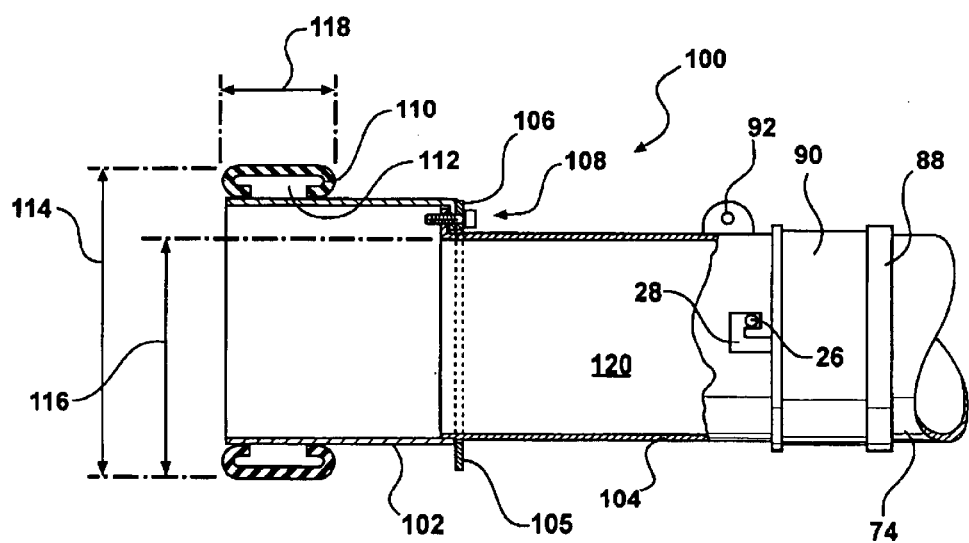
FIG. 5 is a cross-sectional view of another embodiment of the launcher assembly.

Referring to FIG. 5, another embodiment of the launcher 100 includes a retainer 102 detachably assembled to guide 104. The retainer 102 includes an outer diameter 114 specifically sized for application of a pipe liner to a sewer line of a specific inner diameter or range of diameters. As appreciated, for sewer pipes of differing inner diameters, different retainer outer diameters 114 are required, while a single outer diameter 116 of the guide 104 can be used for a greater range of sewer pipe applications. The guide 104 provides a passage 120 through which the pipe liner and bladder tube assembly pass during installation. The passage 120 size allows nonrestrictive movement of the pipe liner and bladder assembly therethrough during installation.

The guide 104 includes a flange 106 with a plurality of opening for fasteners 108. A seal 105 disposed between the guide 104 and the retainer 102 prevents air leakage during assembly. Because the guide 104 is separate and attachable to the retainer 102, retainers 102 of differing sizes can be mated to a single guide 104. This reduces the amount of equipment required for assembly of pipe liners to sewer pipes of differing sizes. Although, preferably the guide is assembled to the retainer 102 by way of threaded fasteners 108, it is within the contemplation of this invention to use any type of fastening mechanism known to a worker knowledgeable in the art.

Figure 6:
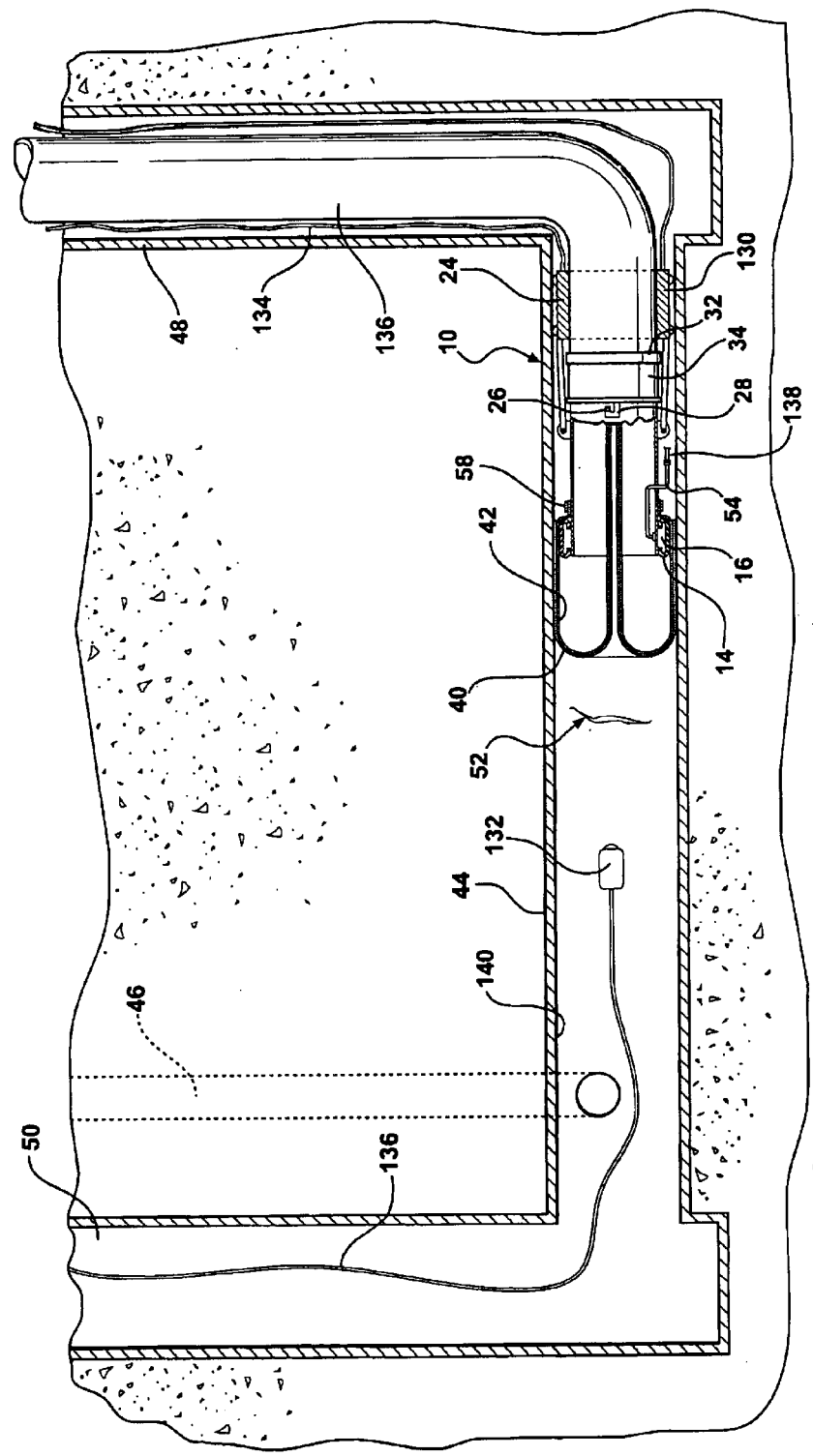
FIG. 6 is a cross-sectional view of the launcher assembly during installation into a sewer pipe.

Referring to FIG. 6, an embodiment of this invention is a method for installing a pipe liner 40 within a sewer pipe 44. The method of this invention provides for the installation of a pipe liner 40 to a discrete portion of a sewer pipe by anchoring the pipe liner 40 and bladder assembly 42 with the launcher assembly 10 and driving the pipe liner 40 and bladder tube assembly forward of the anchored assembly launcher 10.

The method includes the installation of the pipe liner 40 and bladder assembly 42 to the body 12 of the launcher 12. Preparation for installation of the pipe liner 40 into the sewer pipe 44 includes installing the bladder tube 42 into the launcher assembly 10. Installation of the bladder tube 42 includes cuffing or overlapping the bladder assembly 42 around the inflatable member 14. The bladder tube assembly 42 is then clamped to the outer surface of the body 12 by way of hose clamp 58. The hose clamp 58 creates an airtight seal between the bladder assembly 42 and the body 12 of the launcher assembly 10.

In the next step, the pipe liner 40 is cuffed over the inflatable member 14 on the outside of the bladder 42. The pipe liner 40 is impregnated with a curable resin before being installed onto the launcher assembly 10. Impregnating of the pipe liner 46 with a curable resin is a well-known aspect in pipe liner installation, and a worker skilled in the art would recognize that many different methods of impregnating the pipe liner are within the contemplation of this invention.

The launcher 10 is then attached to a positioning device for movement into position within the sewer pipe. In one embodiment of this invention the positioning device is a rotating/lifting machine 130. The machine 130 attaches to lugs 56 of the launcher assembly 10. The machine 130 is inserted into the main line 44 through a first manhole 48 or access opening with the launcher assembly 10. Guide and control lines 134 extend from the machine 130 to the surface and are connected to a control device (not shown) controlled from the surface.

Figure 8:
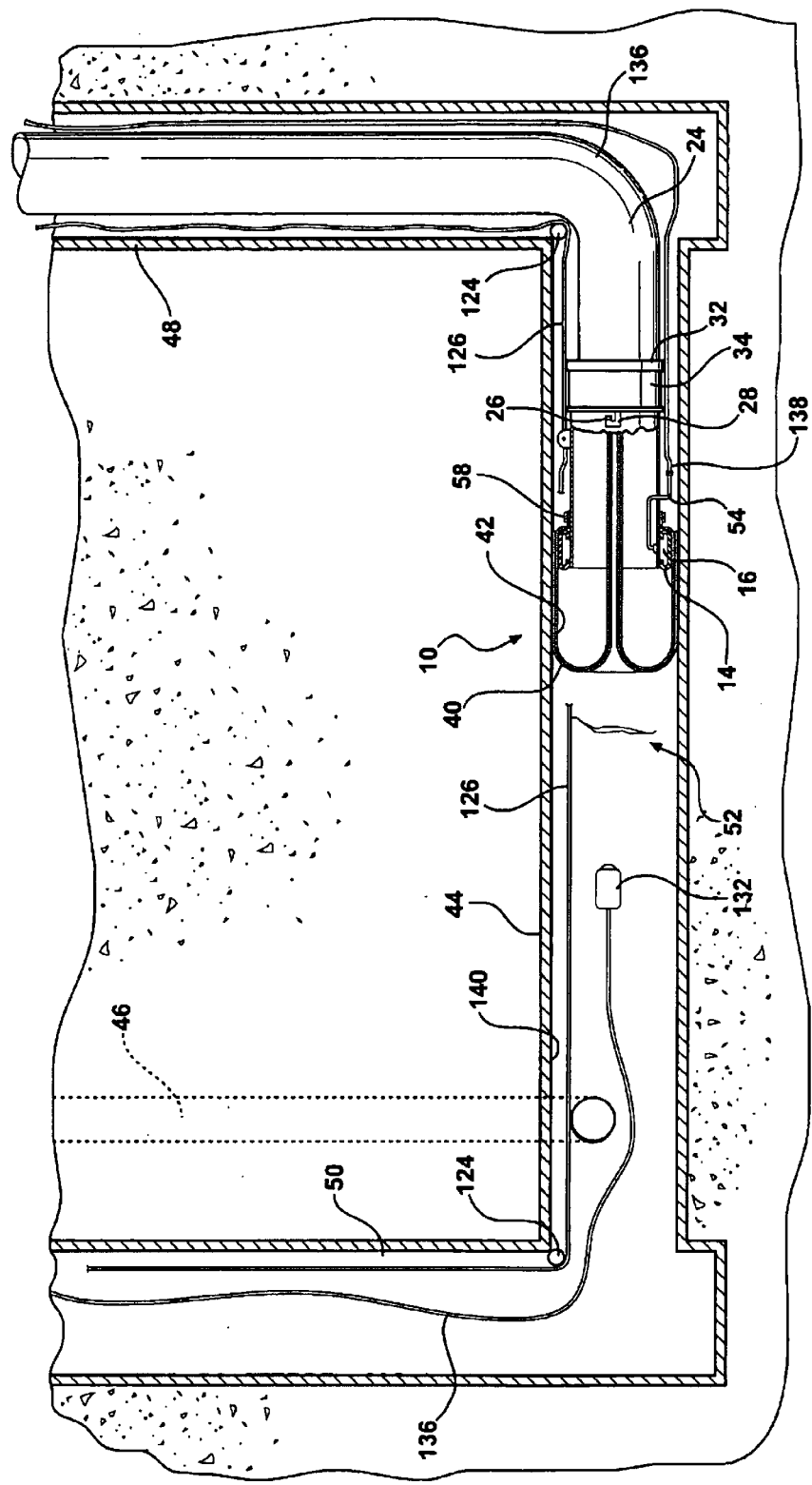
FIG. 8 is a cross-sectional view of another embodiment of the launcher during installation within the sewer pipe.

In another embodiment of this invention shown in FIG. 8, the positioning device is a system of cables including pulleys 124 and cables 126 attached to the launcher 10 and operated to pull and guide the launcher 10 into position within the sewer pipe 44. Note that it is within the contemplation to use any device or configuration to position the launcher as is known to a worker skilled in the art.

Referring back to FIG. 6, cameras 132 are disposed within the main line 44 of the sewer pipe. Each of the cameras 132 transmits a view of the position of the launcher assembly 10 to an operator on the surface to guide the machine 130 and the launcher 10 into place. Cameras 132 are positioned in multiple locations within the sewer line 44 and on the machine 130 providing necessary view for the proper positioning of the launcher 10. Note that the position and number of cameras 130 used is application specific and that more or less cameras 130 may be used to view installation of the launcher assembly 10 within the sewer pipe 44. The cameras 130 may be of any type known to a worker skilled in the art and may be positioned in various locations around the launcher 12 and machine 130.

The launcher 10 is positioned relative to a discrete location within the sewer pipe 44 such as a hole or damaged section of sewer pipe as is generally indicated at 52. Further the launcher 10 may also be positioned such that pipe liner 40 is not installed over openings leading to branch sewer lines 46.

Figure 7:
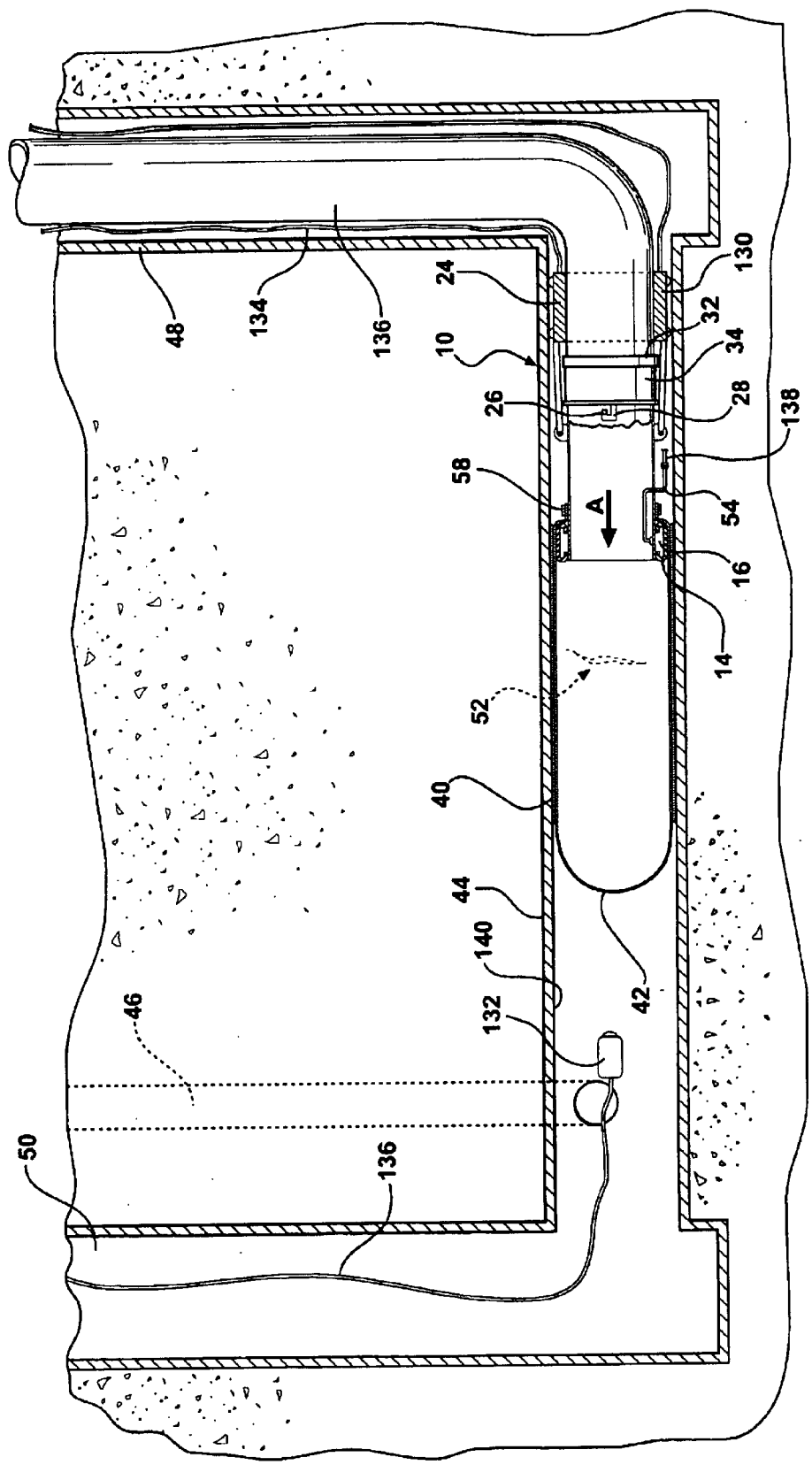
FIG. 7 is a cross-sectional view of the launcher assembly installed within the branch line of the sewer pipe.

Referring to FIG. 7, the launcher 10 is moved into position within the sewer pipe 44 by the machine 130. The inflatable collar 14 is then actuated to the inflated condition to trap the bladder 42 and pipe liner 40 against the inner surface 140 of the sewer pipe 44. Once the inflatable collar 14 has trapped the bladder 42 and pipe liner 40 against the inner surface 140 of the sewer pipe 44, air pressure applied, as indicated by arrows A, drives the bladder assembly 42 and pipe liner 40 into the main line sewer pipe 44. As the air pressure indicated at A, drives the bladder 42 and pipe liner 40 into the sewer pipe 44, the entire length of the pipe liner 40 is drawn through the passage 18 of the launcher assembly 10. Air pressure applied to the bladder assembly 42 is introduced through the carrier tube 24. Note that the seal 36 ensures airtight integrity within the passage 18. Extension of the bladder assembly 42 and pipe liner 40 occurs substantially instantaneously at a pressure creating enough force to drive the pipe liner 40 into the sewer pipe 44. The inflatable member 14 is then deflated. The bladder 42 supports the launcher assembly 10 once fully inflated. The bladder 42 remains inflated until the pipe liner 40 hardens. Once the pipe liner 46 is hardened, the bladder 42 is deflated and the launcher removed from the sewer pipe 44.

The foregoing description is exemplary and not just a material specification. The invention has been described in an illustrative manner, and should be understood that the terminology used is intended to be in the nature of words of description rather than of limitation. Many modifications and variations of the present invention are possible in light of the above teachings. The preferred embodiments of this invention have been disclosed, however, one of ordinary skill in the art would recognize that certain modifications are within the scope of this invention. It is understood that within the scope of the appended claims, the invention may be practiced otherwise than as specifically described. For that reason the following claims should be studied to determine the true scope and content of this invention.

What is claimed is:

1. An assembly for introducing a pipe liner into a sewer pipe, said assembly comprising;

a launcher defining a passageway through which said pipe liner passes;

an inflatable bladder assembly for everting said pipe liner into said sewer pipe;

an inflatable member attached to said launcher and actuatable between an inflated and deflated condition, said inflatable member including an outer diameter corresponding with an inner diameter of said sewer pipe, said inflatable member securing at least a part of said launcher and said inflatable bladder assembly within the sewer pipe in said inflated condition.

2. The assembly of claim 1, wherein said inflatable member is bonded to said launcher.

3. The assembly of claim 1, wherein said inflatable member defines an inner cavity including an air inlet, said air inlet in communication with a source of pressurized air for selectively expanding said inflatable member.

4. The assembly of claim 1, wherein said launcher includes an outer diameter, said inflatable member disposed about said outer diameter.

5. The assembly of claim 1, wherein said launcher comprises a retainer and a guide, said inflatable member mounted to said retainer.

6. The assembly of claim 5, further including a carrier tube connected to said guide, said carrier tube including mating interlocking members.

7. The assembly of claim 5, wherein said retainer includes a diameter greater than said guide.

8. The assembly of claim 1, further including a mounting lug for attaching a positioning device to said launcher for locating said launcher within the sewer pipe.

9. A method of installing a pipe liner within a sewer pipe comprising the steps of;

positioning one end of the pipe liner over an inflatable member attached to a retainer and actuatable between inflated and deflated conditions;

securing an inflatable bladder assembly over the inflatable member to the launcher;

placing the retainer member within a sewer pipe; and inflating the inflatable member to said inflated condition to secure the pipe liner between the inflatable member and an inner surface of the sewer pipe.

10. The method of claim 9, further comprising the step of inflating the inflatable bladder to drive the pipe liner into the branch pipe.

11. The method of claim 9, further comprising the step of forcing the pipe liner against the inner surface of the branch pipe for a curing period.

12. An assembly for introducing a pipe liner into a sewer pipe, said assembly comprising:

a launcher defining a passageway through which said pipe liner passes, said launcher comprises a retainer and a guide;

a carrier tube connected to said guide, said carrier tube including mating interlocking members, an inflatable bladder; and an inflatable member mounted to said retainer and actuatable between an inflated and deflated condition, said inflatable member including an outer diameter corresponding with an inner diameter of said sewer pipe, said inflatable member securing at least a part of said launcher and said inflatable bladder assembly within the sewer pipe in said inflated condition.

13. The assembly of claim 12, wherein said inflatable member is bonded to said launcher.

14. The assembly of claim 12, wherein said inflatable member defines an inner cavity including an air inlet, said air inlet in communication with a source of pressurized air for selectively expanding said inflatable member.

15. The assembly of claim 12, wherein said launcher includes an outer diameter, said inflatable member disposed about said outer diameter.

16. The assembly of claim 12, wherein said retainer includes a diameter greater than said guide.

17. The assembly of claim 12, further including a mounting lug for attaching a positioning device to said launcher for locating said launcher within the sewer pipe.

* * * * *